(12) United States Patent
Horii et al.

(10) Patent No.: US 9,077,057 B2
(45) Date of Patent: Jul. 7, 2015

(54) STRUCTURE FOR COOLING BATTERY CELLS ACCOMMODATED IN BATTERY MODULE CASE

(75) Inventors: Naoyuki Horii, Okazaki (JP); Nobuyuki Kawai, Okazaki (JP); Masaru Kadoi, Anjo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 1280 days.

(21) Appl. No.: 12/343,544

(22) Filed: Dec. 24, 2008

(65) Prior Publication Data

US 2009/0197166 A1    Aug. 6, 2009

(30) Foreign Application Priority Data

Jan. 31, 2008   (JP) ................................. 2008-021615

(51) Int. Cl.
| | |
|---|---|
| *H01M 2/10* | (2006.01) |
| *H01M 10/613* | (2014.01) |
| *B60K 1/04* | (2006.01) |
| *H01M 10/625* | (2014.01) |
| *H01M 10/647* | (2014.01) |
| *H01M 10/6566* | (2014.01) |
| *B60K 1/00* | (2006.01) |

(52) U.S. Cl.
CPC ............. *H01M 10/5004* (2013.01); *B60K 1/04* (2013.01); *B60K 2001/005* (2013.01); *B60K 2001/0438* (2013.01); *B60K 2001/0472* (2013.01); *H01M 2/1077* (2013.01); *H01M 2/1083* (2013.01); *H01M 10/5016* (2013.01); *H01M 10/5032* (2013.01); *H01M 10/5073* (2013.01)

(58) Field of Classification Search
CPC ............ H01M 2/1077; H01M 6/5038; H01M 10/5004
USPC .......................... 429/100, 148, 176, 177, 120
See application file for complete search history.

(56) References Cited

U.S. PATENT DOCUMENTS

| | | | | |
|---|---|---|---|---|
| 3,623,917 | A | * | 11/1971 | Chassoux ........................ 429/99 |
| 5,800,942 | A | * | 9/1998 | Hamada et al. ................ 429/148 |
| 7,713,655 | B2 | * | 5/2010 | Ha et al. ........................... 429/99 |
| 2001/0046624 | A1 | * | 11/2001 | Goto et al. ....................... 429/99 |
| 2005/0153199 | A1 | * | 7/2005 | Yagi et al. ...................... 429/148 |
| 2005/0170239 | A1 | | 8/2005 | Uemoto et al. |
| 2005/0231158 | A1 | * | 10/2005 | Higashino ..................... 320/112 |
| 2006/0141353 | A1 | * | 6/2006 | Watanabe et al. ............. 429/148 |
| 2006/0172187 | A1 | * | 8/2006 | Ambrosio et al. ............. 429/120 |

FOREIGN PATENT DOCUMENTS

| | | |
|---|---|---|
| JP | 2000-67934 A | 3/2000 |
| JP | 2004-311157 A | 11/2004 |
| JP | 2006-107774 A | 4/2006 |

* cited by examiner

*Primary Examiner* — Maria J Laios
(74) *Attorney, Agent, or Firm* — Birch, Stewart, Kolasch & Birch, LLP

(57) ABSTRACT

A battery module case includes: a first case in which a plurality of first battery cells is held in a stacked state and which includes a first plate formed with a first cutout portion from which an end surface of one of the first battery cells which is adjacent to the first plate is exposed; and a second case in which a plurality of second battery cells is held in a stacked state and which includes a second plate confronting the first plate and formed with a second cutout portion from which an end surface of one of the second battery cells which is adjacent to the second plate is exposed. When the first and the second plates are arranged adjacent to each other, the first cutout portion and the second cutout portion define a passage in which cooling fluid can flow between the first plate and the second plate.

6 Claims, 5 Drawing Sheets

STRUCTURE FOR COOLING BATTERY CELLS ACCOMMODATED IN BATTERY MODULE CASE

BACKGROUND OF THE INVENTION

1. Field of the Invention

The present invention relates to a battery module case in which a plurality of battery cells are stored.

2. Description of the Related Art

Electric vehicles have been considered more and more to reduce exhaust gas discharged from vehicles to the environment. Since an electric vehicle obtains its driving force by driving electric motors, battery cells which constitute an electric power source are installed in the vehicle. In the electric vehicle, since a large number of battery cells needs to installed in a limited space, a plurality of battery cells are stacked to constitute a battery module, and a large number of battery modules are stored in a battery case disposed underneath a floor of the vehicle. A plurality of battery cells is stored in a stacked state in a battery module case.

The lives of battery cells can be maintained long while maintaining a high battery efficiency by holding the battery cells in a predetermined temperature range. In addition, in order to eliminate any variation in battery performance, it is required to maintain the temperatures of many battery cells uniform by suppressing the occurrence of a difference in temperature therebetween. Because of this, there have been proposed various art for cooling battery cells uniformly (for example, refer to JP-A-2000-67934 and JP-A-2004-311157).

Related art disclosed in JP-A-2000-67934 is art in which a guide is provided at an inducing portion of a cooling fluid passage of a battery module so that the cooling fluid is allowed to flow uniformly throughout the fluid passage so as to attain a uniform dissipation of heat of the battery module. In addition, related art disclosed in JP-A-2004-311157 is art in which a plurality of battery modules is disposed in such a manner that their terminals are made to confront each other and a cooling fluid is divided to flow into the battery modules from a cooling fluid passage where the terminals are made to confront each other, so as to cool the plurality of battery modules uniformly.

According to the related art, the battery cells which are stacked in the battery modules can be cooled uniformly on the basis of battery module by battery module. However, since in the battery module, a plurality of battery cells is stored in a battery module case, according to the related art, although a plurality of battery modules can be cooled uniformly, there is caused a variation in cooling of the plurality of battery cells stacked in the single battery module.

Namely, the battery module is made up of a case which has face plates on both sides of a frame element and a plurality of battery cells stored in the case, and the plurality of battery cells is stacked between the face plates. In addition, a plurality of battery modules like the battery module described above is disposed in a battery case, so as to constitute, for example, a power source of an electric vehicle. As this occurs, face plates of adjacent battery modules are made to confront each other, and hence, two face plates result in being provided between battery cells lying at end portions of the adjacent battery modules. Because of this, a sufficient cooling fluid passage cannot be formed between the battery cells lying at the end portions of the battery modules, and hence, the battery cells at the end portions can receive a cooling fluid on only one side thereof. Thus, the cooling of the battery cells lying at the end portions becomes insufficient, compared with the other battery cells in the battery modules which can receive the cooling fluid on both sides thereof.

Consequently, it becomes difficult to maintain a high and uniform battery efficiency of the plurality of battery cells on the basis of battery module by battery module, and the deterioration of one battery cell has resulted in the deterioration of one battery module.

SUMMARY OF THE INVENTION

It is therefore an object of the invention to provide a battery module case which can store a plurality of battery cells in such a manner that the plurality of battery cells can be cooled uniformly on the basis of battery module by battery module.

In order to achieve the object, according to the invention, there is provided a battery module case comprising:

a first case in which a plurality of first battery cells is held in a stacked state and which includes a first plate formed with a first cutout portion from which an end surface of one of the first battery cells which is adjacent to the first plate is exposed; and a second case in which a plurality of second battery cells is held in a stacked state and which includes a second plate confronting the first plate and formed with a second cutout portion from which an end surface of one of the second battery cells which is adjacent to the second plate is exposed, wherein when the first plate and the second plate are arranged adjacent to each other, the first cutout portion and the second cutout portion define a passage in which cooling fluid can flow between the first plate and the second plate.

The first case may include a third plate formed with a third cutout portion from which an end surface of one of the first battery cells which is adjacent to the third plate is exposed, and the first case may include the first plate and the third plate at both ends thereof in a stack direction in which the first battery cells are stacked.

The first case may include rectangular frames which are provided, respectively, on side portions of the first case in the stack direction, and the rectangular frames may be connected with the first and third plates and are connected with each other by thin plates.

The rectangular frames may be connected with each other by a reinforcement plate at the first cutout portion.

The first and second battery cells may be made to constitute a power source of a vehicle which obtains a driving force by electric motors, and a plurality of pairs of the first case and the second case may be disposed on the vehicle in such a manner that the first and second plates are confronted to each other.

DETAILED DESCRIPTION OF THE INVENTION

Figure 1:
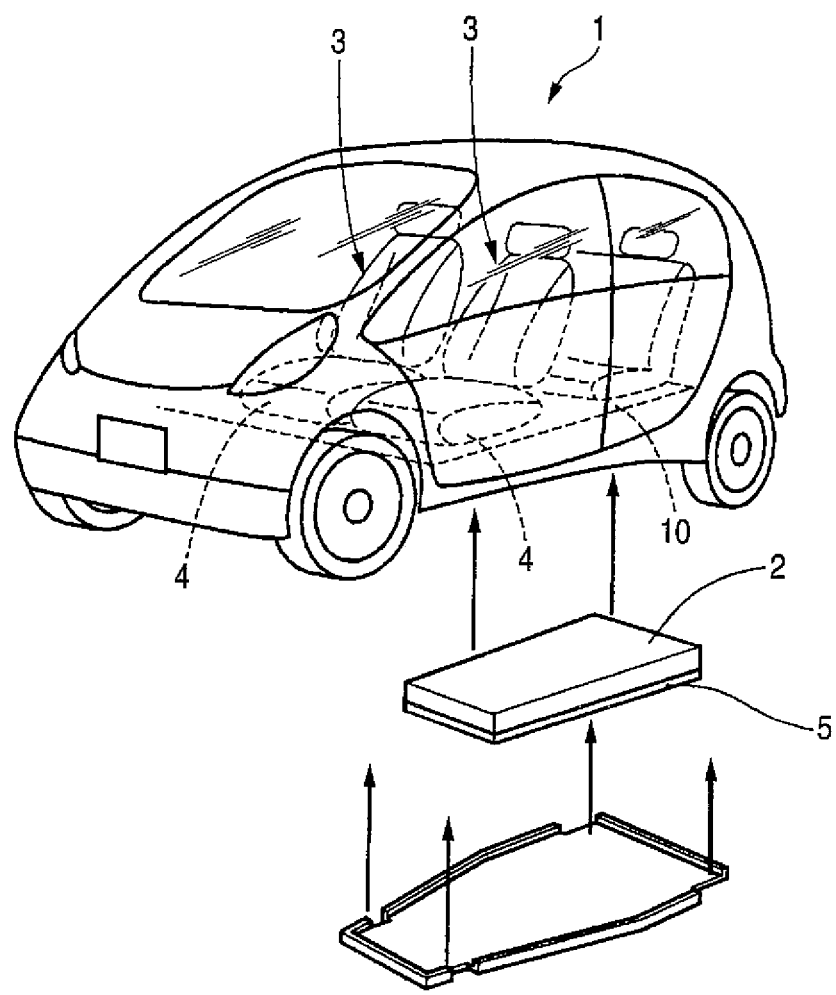
FIG. 1 is an external view of an electric vehicle in which battery cells are stored in a battery module case according to an embodiment of the invention.

As shown in FIG. 1, a battery case 2 is attached to a lower frame (whose illustration is omitted) of an electric vehicle 1, and the battery case 2 is covered by a floor panel 10 and constitutes a floor member. Seats 3 are supported on the floor panel 10, and a large number of battery modules are stored in the floor panel 10 (the battery case 2) underneath seat cushions 4 of the front seats 3. A high voltage circuit is formed by electrically connecting battery cells stored in the battery modules and a power source is then constituted for driving the vehicle.

Figure 2:
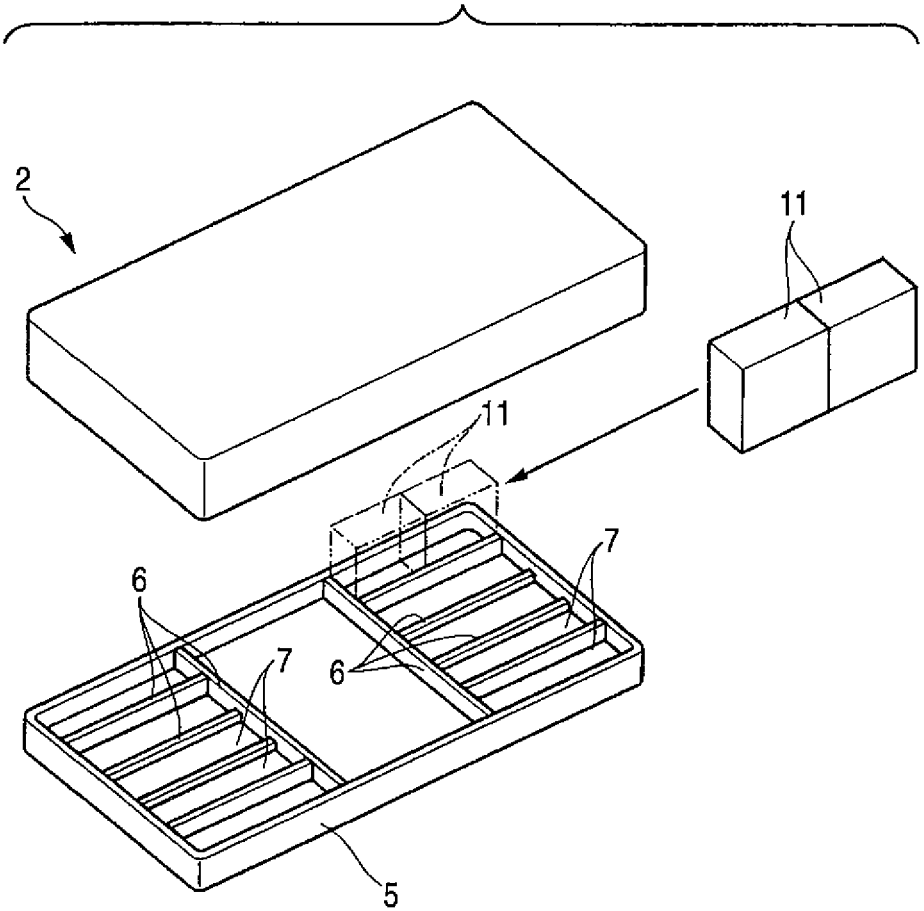
FIG. 2 is an exploded perspective view of a battery case in which the battery module case is stored.
Figure 3:
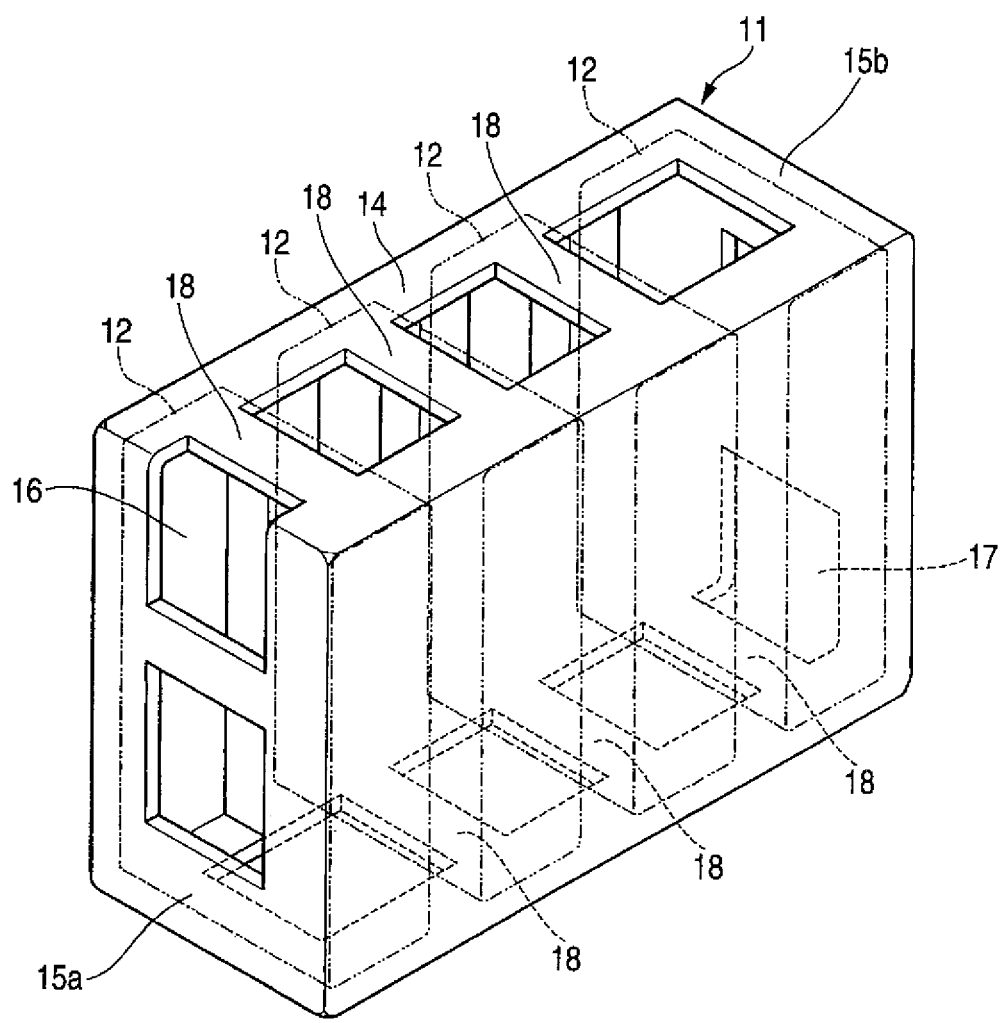
FIG. 3 is an external view of the battery module case according to the embodiment of the invention.

As shown in FIG. 2, a large number of module storage portions 7 are formed on a bottom plate 5 of the battery case 2 by partition plates 6, and for example, two battery module cases, which will be described later, are stored in each of the module storage portions 7 so formed. Note that there are module storage portions 7 where only one battery module case is stored. Although details will be described later, four battery cells are stored in one battery module case so as to constitute a battery module, and hence, eight battery cells are stored in two battery modules. Because of this, for example, in a case where five rows of module storage portions 7 are provided, 40 battery cells are stored in total.

A cooling fluid is introduced into an interior of the battery case 2 from an induction port, not shown, and the cooling fluid so induced flows through interiors of the battery module cases so as to cool the battery cells, whereby the increase in temperature of the battery cells is suppressed. As cooling methods for cooling the battery case 2, for example, methods are considered in which air drawn into a vehicle body as a result of a vehicle being driven is introduced to the battery case 2 and a cooling fluid which is supplied in response to the driving of the vehicle is caused to flow into interiors of battery modules and in which a cooling fluid is forced to flow into interiors of battery modules by the use of a cooling system.

The configuration of the battery module case will be described based on FIGS. 3 to 6. A sectional view shown in FIG. 4 depicts a situation in which two battery modules are stored in one module storage portion 7 (refer to FIG. 2).

As shown in the drawings, a battery module case 11 includes a frame element 13 in which a plurality of battery cells 12 (four battery cells in the example depicted in the drawings) is stacked at predetermined intervals, and the frame element 13 includes rectangular frames 14 which are provided, respectively, on side portions thereof along a direction in which the four battery cells are stacked. The rectangular frames 14 are connected together by face plates 15 at both ends thereof in the stack direction of the battery cells 12, and the face plates 15 are made to cover part of board surfaces of the battery cells.

Namely, a one-end cutout portion 16 is formed in a surface of the face plate 15a at one end side (a left-hand side as viewed in FIG. 4) of the battery module case 11 in such a manner that a one-end side (an upper end side) of a board surface of the leftmost battery cell 12 is exposed therefrom, and the other-end cutout portion 17 is formed in a surface of the face plate 15b at the other end side (a right-hand side as viewed in FIG. 4) of the battery module case 11 in such a manner that the other-end side (a lower end side) of a board surface of the rightmost battery cell 12 is exposed therefrom.

Figure 4:
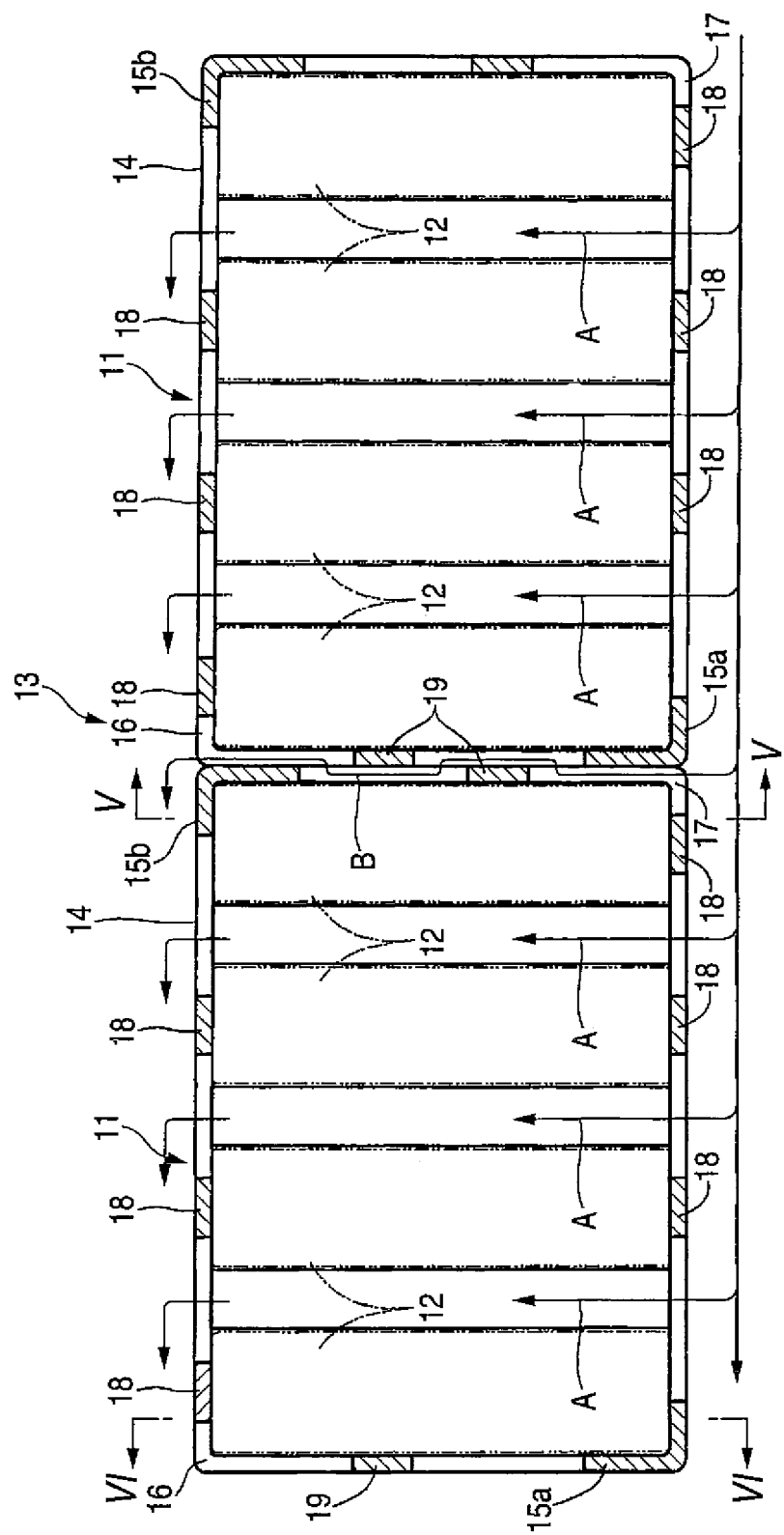
FIG. 4 is a sectional view of the battery module cases according to the embodiment of the invention.
Figure 5:
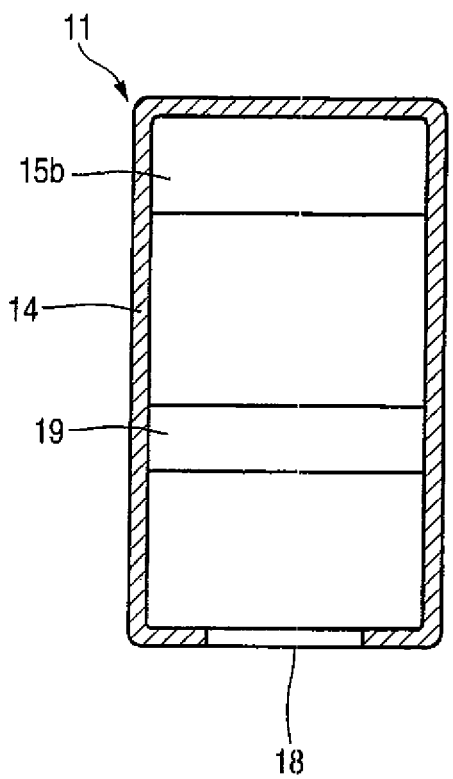
FIG. 5 is a sectional view taken along the line V-V and as viewed in a direction indicated by arrows attached to the line V-V shown in FIG. 4.
Figure 6:
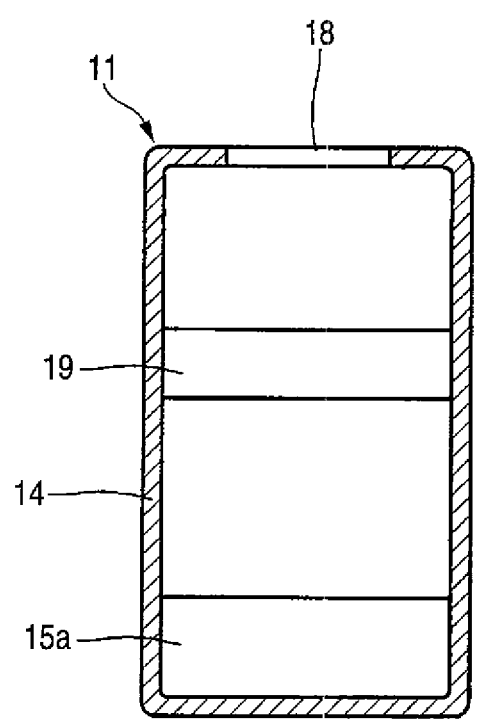
FIG. 6 is a sectional view taken along the line VI-VI and as viewed in a direction indicated by arrows attached to the line VI-VI shown in FIG. 4.

As shown in FIG. 4, when two battery module cases 11 are disposed in a line in such a manner that a face plate 15a of a one-end cutout portion 16 of one battery module case 11 is made to confront a face plate 15b of the other-end cutout portion 17 of the other battery module case 11, a passage through which a cooling fluid is allowed to flow is formed between the one-end cutout portion 16 of the one battery module case 11 and the other-end cutout portion 17 of the other battery module case 11 by confronting portions of the face plates 15. In addition, the rectangular frames 14 are connected together by thin plates 18 at appropriate locations along upper outer circumferential portions and lower outer circumferential portions thereof. Additionally, the rectangular frames 14 are also connected together by a reinforcement plate 19 in each of the one-end cutout portion 16 and the other-end cutout portion 17.

Four battery cells 12 are stored in a stacked state in the battery module case 11 which is configured as has been described above so as to constitute a battery module. Then, two battery module cases 11 are stored in one module storage portion 7 shown in FIG. 2, and the two battery module cases 11 are disposed in such a manner that a face plate 15b of the battery module case 11 on one side (a left-hand side as viewed in FIG. 4) and a face plate 15a of the battery case 11 on the other side (a right-hand side as viewed in FIG. 4) are made to confront each other.

Namely, the position of the face plate 15b of the battery module case 11 on the one side (the left-hand side in FIG. 4) corresponds to or confronts the one-end cutout portion 16 of the battery module case 11 on the other side (the right-hand side in FIG. 4), whereas the face plate 15a of the battery module case 11 on the other side (the right-hand side in FIG. 4) corresponds to or confronts the other-end cutout portion 17 of the battery module case 11 on the one side (the left-hand side in FIG. 4).

Because of this, a cooling fluid passage is formed between the confronting sides of the two battery module cases 11 in such a manner as to communicate from the other-end cutout portion 17 to the one-end cutout portion 16, whereby a cooling fluid is supplied to outer surfaces (surfaces confronting the face plates 15) of the battery cells 12 which are provided at the confronting end portions of the battery module cases 11 which are disposed in a line in the module storage portion 7.

For example, in FIG. 4, when the cooling fluid is introduced from a right lower portion of the module storage portion 7 to flow leftwards therein, the cooling fluid is allowed to flow upwards through gaps formed between the battery cells 12 to flow leftwards. The cooling fluid is allowed to flow into flow paths defined by the gaps between the battery cells 12 which are disposed centrally of the battery module case 11 to continue to flow upwards (as indicated by arrows A in FIG. 4) along board surfaces of the battery cells 12 so disposed, whereby the battery cells 12 are cooled from both sides thereof so as to suppress the generation of heat therefrom.

As to the battery cells 12 provided at the confronting end portions of the battery module cases 11 which are disposed in a line in the module storage portion 7, the cooling fluid is allowed to flow into the flow path defined by the gap on one side of each of the battery cells 12 to continue to flow upwards (as indicated by the arrow A in the figure) along one board surface thereof. In addition, the cooling fluid flows from the other-end cutout portion 17 to the one-end cutout portion 16 to continue to flow upwards (as indicated by an arrow B in the figure) along respective board surfaces of the battery cells 12 which confront the face plates 15 of the battery module cases 11.

Because of this, when the battery module cases 11 are disposed in a line in such a manner that the face plate 15a of the one-end cutout portion 16 of the one battery module case 11 and the face plate 15b of the other-end cutout portion 17 of the other battery module case 11 confront each other, the cooling fluid passage is formed between the one-end cutout portion 16 and the other-end cutout portion 17 of the face plates 15 so that the cooling fluid is allowed to flow through the cooling fluid passage so formed.

Consequently, the cooling fluid is allowed to flow to not only both the board surfaces of the battery cells 12 which are provided centrally of the battery module cases 11 but also both the board surfaces of the battery cells 12 which are provided at the corresponding end portions of the battery module cases 11, whereby the cooling fluid is allowed to flow to both the board surfaces of the battery cells 12 irrespective of wherever the battery cells 12 may be positioned in the battery module case to thereby attain the uniform cooling of the battery cells 12. Because of this, the battery module case 11 that has been described heretofore can store the battery cells 12 therein in such a manner that the four battery cells 12 stored therein can be cooled uniformly, that is, in such a manner that the battery cells 12 can be cooled uniformly on the basis of battery module by battery module.

In addition, since the cutout portions are formed in the face plates 15 on the opposite sides at the one end side and the other end side of the battery module case 11, the strength of the battery module case 11 can be maintained. In addition, since the rectangular frames 14 are connected together by the thin plates 18 and the reinforcement plates 19, the strength of the frame element 13 can be maintained sufficiently while ensuring the fluid flow paths and passage.

In the embodiment described above, while the embodiment has been described as being configured in such a manner that the face plates 15 are provided at both the ends of the frame element 13 in the direction in which the battery cells 12 are provided, with the one-end cutout portion 16 and the other-end cutout portion 17 being formed, respectively, in the face plates 15 which are disposed at the ends of the frame element 13, cutout portions can be provided on sides of the adjacent battery module cases 11. Namely, a face plate 15 can be provided on an arbitrary side (location) of the frame element 13, and hence, face plates can be provided in locations which confront battery module cases 11 in adjacent module storage portions 7. By adopting this configuration, a flow of cooling fluid can be ensured not only in the direction in which the battery cells 12 are stacked but also in the direction which confronts the battery module cases 11 in the adjacent module storage portions 7, whereby the battery cells 12 in the adjacent battery module cases 11 can be cooled uniformly.

In addition, in the embodiment described above, while the embodiment has been described as the four battery cells 12 being stored in the battery module case 11, a plurality of battery cells other than four, for example, two, three, five or more battery cells can be stored in the battery module case 11. In addition, in the embodiment described above, while the embodiment has been described as the battery cells 12 being installed in the electric vehicle, the invention can also be applied to the installation of battery cells in a hybrid vehicle or a fuel cell vehicle.

According to an aspect of the invention, when the face plate of the one-end cutout portion of one battery module case and the face plate of the other-end cutout portion of the other battery module case are provided adjacent in such a manner as to confront close each other, the passage which enables a flow of cooling fluid is made to be formed between the one-end cutout portion and the other-end cutout portion by confronting portions of the face plates so provided, which results in a state in which the cooling fluid passage is formed between outer board surfaces of the battery cells which are disposed at respective end portions of the battery module cases provided adjacent to each other, whereby the cooling fluid is allowed to flow on both board surfaces of any battery cells irrespective of their positions within the battery module case. In addition, since the cutout portions in the face plates are provided in an opposite fashion on the one side and the other side of the battery module case, the strength of the battery module case can be maintained.

Because of this, the plurality of battery cells can be stored in the battery module case in such a manner that the battery cells can be cooled uniformly on the basis of battery module by battery module. In addition, since the cutout portions are formed in the face plates in such a manner as to be positioned diagonally of the frame element, the battery module with a good cooling efficiency can be provided by the use of the same frame element.

In disposing battery modules in a line along a direction in which the battery cells are stacked, a location where their frame elements are in contact with each other becomes disadvantageous in terms of head dissipation.

According to an aspect of the invention, by providing the cutout portions in the surfaces lying at both ends of the battery module case in the stack direction of the battery cells, the dissipation of heat at the disadvantageous location can be promoted.

According to an aspect of the invention, the rectangular frames are connected together by the thin plates, whereby the strength of the frame element can be maintained.

According to an aspect of the invention, the reinforcement plates are provided at the cutout portions, whereby the strength of the frame element can be maintained.

According to an aspect of the invention, the plurality of battery module cases like the battery module case is disposed on the vehicle in such a manner that the face plates thereof are made to confront close each other in such a state that the battery cells are stacked in each of the plurality of battery module cases, whereby a large number of battery modules can be installed in the vehicle in such a state that the cooling fluid is allowed to flow on both sides of any battery cells irrespective of their positions within the battery module cases.

According to the battery module case of the invention, the plurality of battery cells can be stored therein in such a manner that the battery cells can be cooled uniformly on the basis of battery module by battery module.

The invention can be applied to an industrial field in which a plurality of battery cells are stored in a battery module case.

What is claimed is:

1. A battery module case comprising:
   a first case in which a plurality of first battery cells is held in a stacked state and which includes a first plate formed with a first cutout portion from which an upper end side surface of one of the first battery cells which is adjacent to the first plate is exposed; and
   a second case in which a plurality of second battery cells is held in a stacked state and which includes a second plate confronting the first plate and formed with a second cutout portion from which a lower end side surface of one of the second battery cells which is adjacent to the second plate is exposed, wherein
   when the first plate and the second plate are arranged to directly oppose one another, the first plate and the second plate jointly form a passage staggering between the first plate and the second plate by the first cutout portion and the second cutout portion,
   the passage extends along surfaces of the first plate and the second plate inside the first plate and the second plate, in which cooling fluid flows from an upper end of the first cutout portion to a lower end of the second cutout portion or from the lower end of the second cutout portion to the upper end of the first cutout portion, the first cutout portion includes a first cutout at an upper side surface of the first plate and a second cutout continuing from the first cutout at a top surface of the first case, the second cutout portion includes a third cutout at a lower side surface of the second plate, and a fourth cutout continuing from the third cutout at a bottom surface of the second case, and the cooling fluid flows into one of the second cutout and the fourth cutout, flows through the first cutout and the third cutout, and flows out from the other of the second cutout and the fourth cutout.

2. The battery module case as set forth in claim 1, wherein the first case includes a third plate formed with a third cutout portion from which a lower end side surface of one of the first battery cells which is adjacent to the third plate is exposed, and the first case includes the first plate and the third plate at both ends thereof in a stack direction in which the first battery cells are stacked.

3. The battery module case as set forth in claim 2, wherein the first case includes rectangular frames which are provided, respectively, on side portions of the first case in the stack direction, and the rectangular frames are connected with the first and third plates and are connected with each other by thin plates.

4. The battery module case as set forth in claim 3, wherein the rectangular frames are connected with each other by a reinforcement plate at the first cutout portion.

5. The battery module case as set forth in claim 1, wherein the first and second battery cells are made to constitute a power source of a vehicle which obtains a driving force by electric motors, and a plurality of pairs of the first case and the second case is disposed on the vehicle in such a manner that the first and second plates are confronted to each other.

6. The battery module case as set forth in claim 1, wherein the staggered passage extends between a bottom and a top of the first and second cases.

* * * * *